United States Patent
Hashimoto

(10) Patent No.: US 6,847,520 B2
(45) Date of Patent: Jan. 25, 2005

(54) ELECTRONIC APPARATUS CAPABLE OF FLIPPING OVER ONE OF CASING BODIES RELATIVE TO THE OTHER

(75) Inventor: Eiji Hashimoto, Nishitokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 52 days.

(21) Appl. No.: 10/364,410

(22) Filed: Feb. 12, 2003

(65) Prior Publication Data

US 2003/0223190 A1 Dec. 4, 2003

(30) Foreign Application Priority Data

May 31, 2002 (JP) ........................................ 2002-159986

(51) Int. Cl.$^7$ ................................................ G06F 1/16
(52) U.S. Cl. ..................... 361/680; 361/681; 312/223.1; 312/223.2
(58) Field of Search ................................ 361/680, 681, 361/683; 312/223.1, 223.2

(56) References Cited

U.S. PATENT DOCUMENTS 6,122,152 A  *  9/2000  Goto et al. ..................... 361/1
6,275,376 B1 *  8/2001  Moon ........................... 361/683
6,707,665 B2 *  3/2004  Hsu et al. ..................... 361/681

FOREIGN PATENT DOCUMENTS

| JP | 10-78830 | 3/1998 |
| JP | 11-39058 | 2/1999 |
| JP | 2000-3230 | 1/2000 |

OTHER PUBLICATIONS

Japanese Office Action, dated Jun. 15, 2004, for Patent Application No. 2002–159986.

* cited by examiner

Primary Examiner—Lynn Feild
Assistant Examiner—Anthony Q. Edwards
(74) Attorney, Agent, or Firm—Pillsbury Winthrop LLP

(57) ABSTRACT

A personal computer has a display panel, a main body, an engaging member and a stopper portion. The display panel and main body are coupled by a hinge mechanism to be rotatable between a first state in which the display panel is superposed on the main body facing a display surface and a second state in which the display panel is superposed on the main body facing a back surface. In the first state, the engaging member projects from the display surface of display panel. In the second state, the engaging member projects from the back surface of display panel. The stopper portion engages the engaging member in each of the first and second states.

10 Claims, 7 Drawing Sheets

ELECTRONIC APPARATUS CAPABLE OF FLIPPING OVER ONE OF CASING BODIES RELATIVE TO THE OTHER

CROSS-REFERENCE TO RELATED APPLICATIONS

This application is based upon and claims the benefit of priority from the prior Japanese Patent Application No. 2002-159986, filed May 31, 2002, the entire contents of which are incorporated herein by reference.

BACKGROUND OF THE INVENTION

1. Field of the Invention

The present invention relates to an electronic apparatus wherein a pair of casing bodies, which are foldable by means of a hinge section, can be fixed in such a state that the casing bodies are superposed on each other.

2. Description of the Related Art

Electronic apparatuses have been used in various fields. There is known an electronic apparatus having an input unit such as a touch panel in order to enhance the operability according to purposes of use.

Jpn. Pat. Appln. KOKAI Publication No. 11-39058 discloses, as an example of the electronic apparatus, a pen-input type electronic apparatus. The electronic apparatus has a main body casing and a cover. The main body casing and the cover are coupled by a hinge. The main body casing includes circuit components such as a printed circuit board, etc. The cover has a display unit and a touch panel. In order to operate the touch panel, the cover is raised away from the main body casing by means of the hinge, and the cover in the raised state is turned over and folded back onto the main body casing such that the touch panel faces outward.

The main case body and the cover are provided with latches and latch holes for fixing them in two states. In one state, the cover is superposed on the main body casing such that a display screen of the cover faces inward. In the other state, the cover is superposed on the main body casing such that the display screen faces outward. The latches are built in the main body casing, and these are operated by each latch knob. The latch holes are formed on both sides of the cover so as to correspond to the latches.

According to the electronic apparatus of Jpn. Pat. Appln. KOKAI Publication No. 11-39058, however, it is presupposed that the input operations are performed through the touch panel. In addition, the latches project from the main body casing so as to fit into the latch holes formed in the cover. If this technique is applied to an electronic apparatus having a keyboard, such as a personal computer, the latches would project from the main casing body in the state in which the cover is raised away from the main body casing, and this would prevent easy operations of the keyboard.

Furthermore, this electronic apparatus is switched between an available state and an unavailable state by turning over the cover. In the use state, the main body casing and the cover are superposed on each other. Since the latch always projects, it cannot be provided on the cover.

BRIEF SUMMARY OF THE INVENTION

An electronic apparatus according to the present invention has a latch mechanism that does not deteriorate the operability of the electronic apparatus.

An electronic apparatus of a first embodiment according to the present invention has a first casing body, a second casing body, an engaging member, and a stopper portion. The second casing body is coupled to the first casing body by means of a hinge mechanism such that the second casing body is rotatable between a first state in which one surface of the second casing body is superposed on the first casing body and a second state in which the other surface of the second casing body is superposed on the first casing body. The engaging member projects from the one surface of the second casing body in the first state, and projects from the other surface of the second casing body in the second state. The stopper portion engages the engaging member in each of the first and second states.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
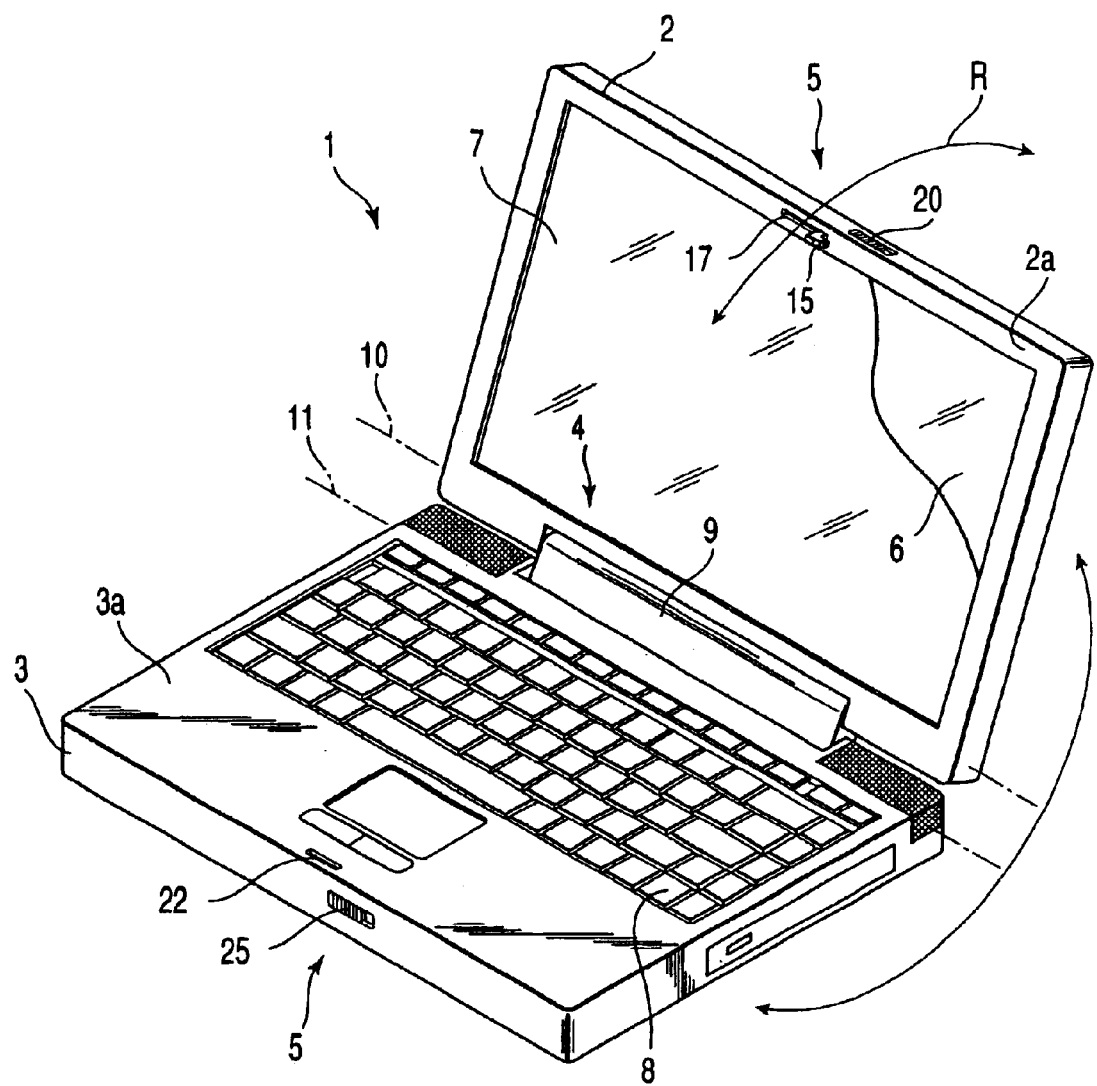
FIG. 1 is a perspective view showing a personal computer according to a first embodiment of the present invention.

Referring to FIGS. 1 to 9, a description will now be given of a personal computer (PC) 1 as an example of an electronic apparatus of a first embodiment according to the present invention. The PC 1 shown in FIG. 1 has a main body 3 as a first casing body, a display panel 2 as a second casing body, a hinge mechanism 4, and a latch mechanism 5. The display panel 2 includes a display screen 6 such as a liquid crystal display, and an input device such as a touch panel 7 superposed on the display screen 6. The main body 3 includes a keyboard 8 exposed to a top surface 3a thereof, a printed circuit board on which a CPU, etc. are mounted, and a hard disk drive as an example of a large-capacity storage medium.

The hinge mechanism 4 has a coupling member 9 and two parallel hinge shafts that allow the display panel 2 to rotate on hinge axes 10 and 11 (indicated by dot-and-dash lines in FIG. 1). The coupling member 9 and display panel 2 are coupled at the hinge axis 10. The coupling member 9 and the main body 3 are coupled at the other hinge axis 11. The hinge mechanism 4 has rotational resistance caused by friction on hinge axes 10 and 11. The coupling member 9 and display panel 2 are held at a desired angle by the friction at the hinge axis 10, and also the coupling member 9 and main body 3 are held at a desired angle by the friction at the hinge axis 11. The hinge mechanism 4 permits rotation of the display panel 2 between a first state (FIG. 2) and a second state. In the first state shown in FIG. 2, the display panel 2 is folded on the main body 3 with a display surface 2a of display panel 2 facing the main body 3. In the second state, the display panel 2 is folded on a bottom surface 3b of the main body 3 with a back surface 2b of the display panel 2 facing the bottom surface 3b. The display panel 2 is moved from the first state to the second state such that the display panel 2 is raised in the direction of double-headed arrow R (in FIG. 1) away from the top surface of the main body 3, then flipped over toward a bottom surface (lower surface) 3b of the main body 3 as shown in FIG. 3, and finally folded in the second state. In short, the hinge mechanism 4 is a so-called double hinge.

The latch mechanism 5 is provided opposed to the hinge mechanism 4. The latch mechanism 5 includes an engaging member 12 and a stopper portion 13. The engaging member 12 is built in the display panel 2, and the stopper portion 13 is provided in the main body 3. FIGS. 4 to 7 show the main structure of the latch mechanism 5, as viewed in the direction of arrow A in FIG. 2. The engaging member 12 includes a shaft 14, and first and second claws 15 and 16 extending radially from the shaft 14.

The first and second claws 15 and 16 are arranged in an angular positional relationship of about 90 degrees. Both claws 15 and 16 are directed to external-angle sides, that is, to obtuse-angle sides. The engaging member 12 rotates on the shaft 14. When the first claw 15 is exposed from the display panel 2 through a first hole 17 formed on the display surface 2a side of display panel 2, the second claw 16 retreats in the display panel 2. When the second claw 16 is exposed from the display panel 2 through a second hole 18 formed on the back surface 2b side of display panel 2 (shown in FIG. 2), the first claw 15 retreats in the display panel 2. The exposed state of the first claw 15 or second claw 16 is maintained by a fixing member 19 that is movable along the display panel 2.

Figure 4:
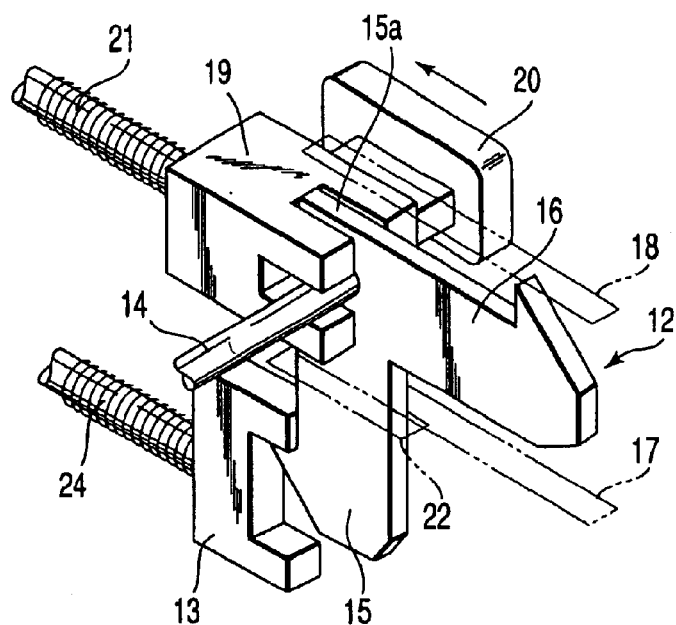
FIG. 4 is a perspective view showing a latch mechanism as viewed in the direction of arrow A in FIG. 2.
Figure 5:
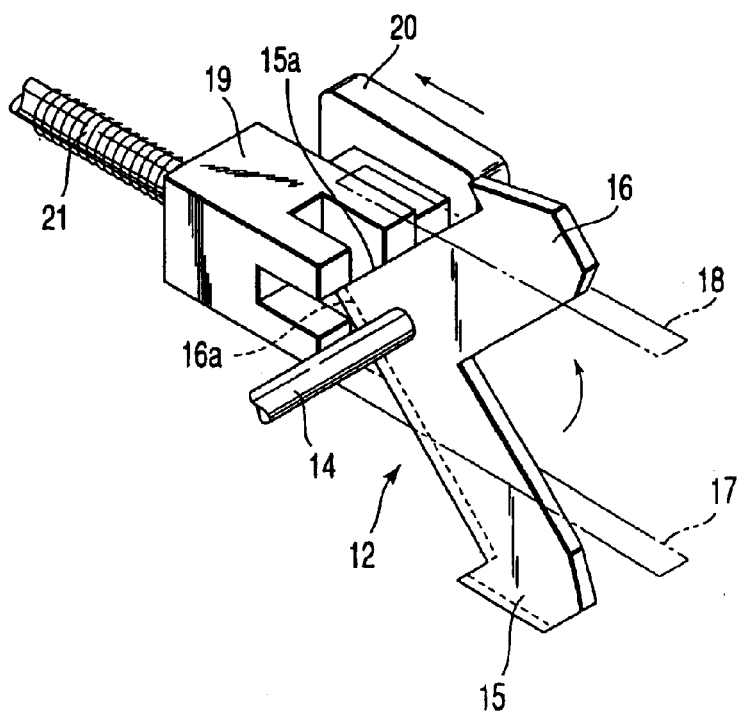
FIG. 5 is a perspective view showing a state in which an engaging member of the latch mechanism shown in FIG. 4 is rotated.
Figure 6:
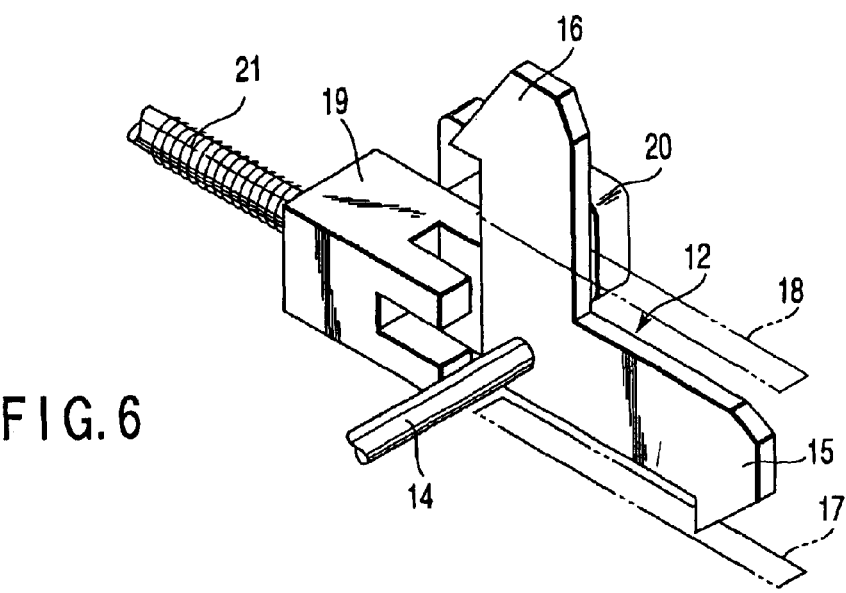
FIG. 6 is a perspective view showing a state in which the engaging member of the latch mechanism shown in FIG. 4 is further rotated and a second claw is exposed from the display panel.
Figure 7:
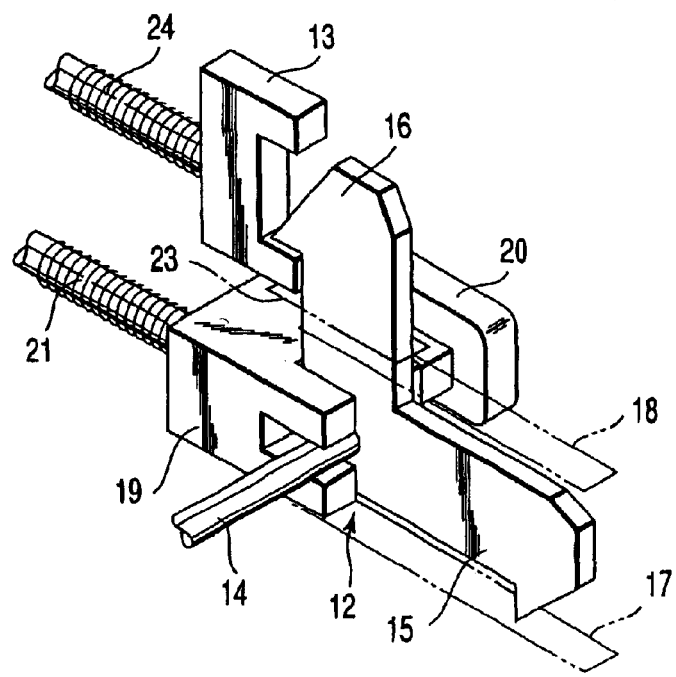
FIG. 7 is a perspective view showing a state in which the latch mechanism of FIG. 4 is engaged in a second state.

The fixing member 19 is operated by a lever 20 exposed on an end face of the display panel 2. The fixing member 19 is urged toward the engaging member 12 by means of a coil spring 21. As is shown in FIG. 4, in the state in which the first claw 15 is exposed, the fixing member 19 abuts on an end face 16a that is located opposed to a distal end portion of the second claw 16 (see FIG. 8). On the other hand, as is shown in FIG. 7, in the state in which the second claw 16 is exposed, the fixing member 19 abuts on an end face 15a that is located opposed to a distal end portion of the first claw 15 (see FIG. 9). The state in which the first claw 15 is exposed from the display panel 2 is switched to the state in which the second claw 16 is exposed from the display panel 2 in the following manner. As is shown in FIG. 5, the lever 20 is operated to release the fixing member 19, and the first claw 15 is pushed into the display panel 2. When the first claw 15 is pushed in the display panel 2, the second claw 16 comes out from the second hole 18. When the second claw 16 is pulled out, the first claw 15 retreats in the display panel 2, as shown in FIG. 6. Upon restoring the lever 20 to the initial position, the engaging member 12 is fixed and the second claw 16 is exposed from the display panel 2.

In the first state shown in FIG. 4, the stopper portion 13 engages the first claw 15 that has been inserted through an opening 22 formed in the top surface 3a of main body 3. In the second state shown in FIG. 7, the stopper portion 13 engages the second claw 16 that has been inserted through an opening 23 formed in the bottom surface 3b of main body 3. The stopper portion 13 is urged toward the claw by means of a coil spring 24. The engagement between the stopper portion 13 and each claw 15, 16 is released by operating a lever 25 exposed on the main body 3.

Figure 2:
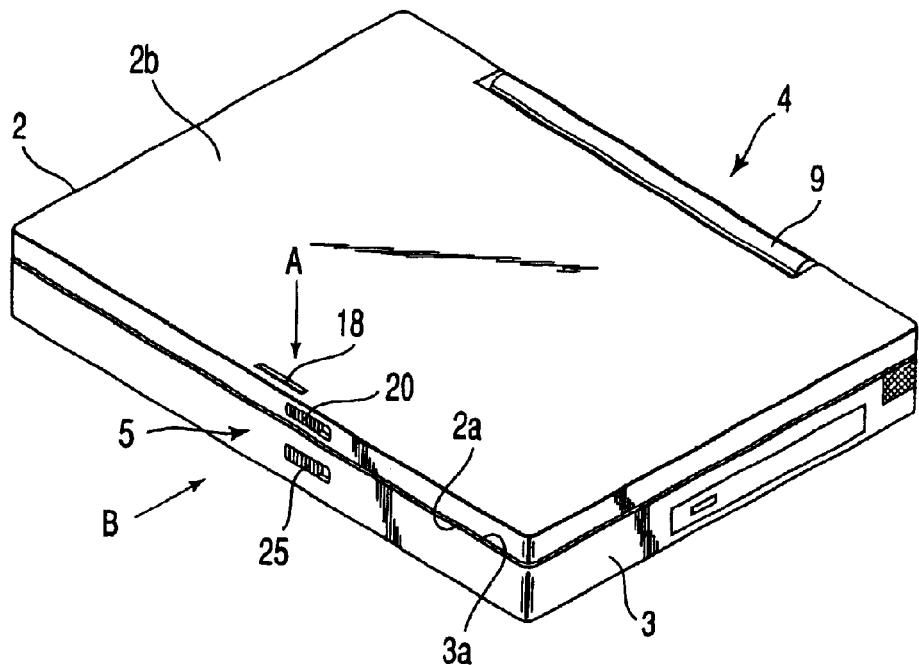
FIG. 2 is a perspective view showing a first state in which a display panel and a main body of the personal computer shown in FIG. 1 are superposed on each other.
Figure 3:
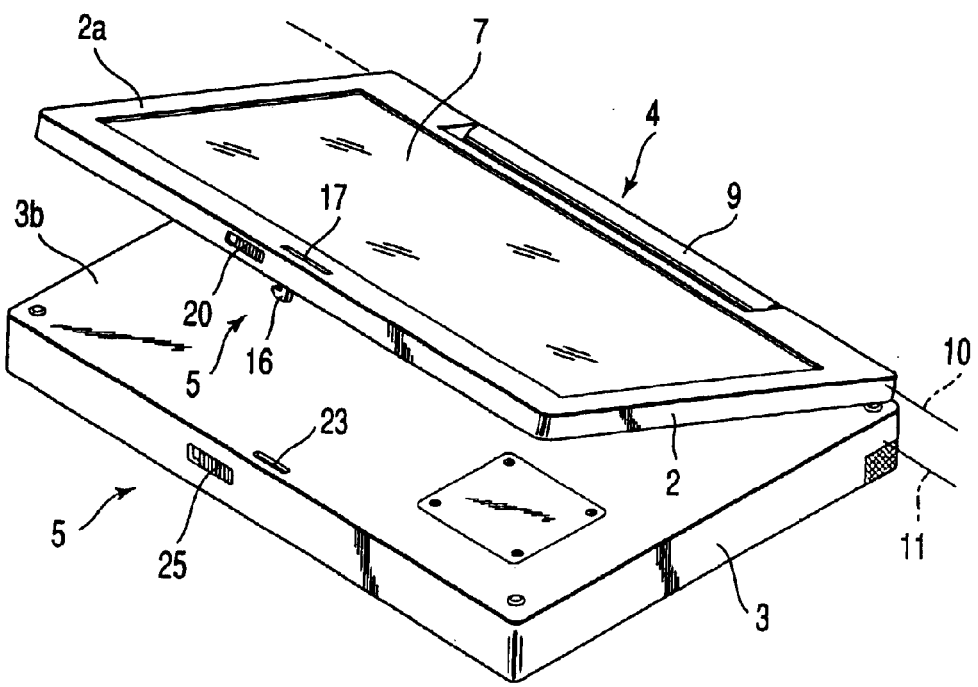
FIG. 3 is a perspective view showing a state in which the display panel of the personal computer of FIG. 1 is flipped over toward a bottom surface side of the display panel.
Figure 8:
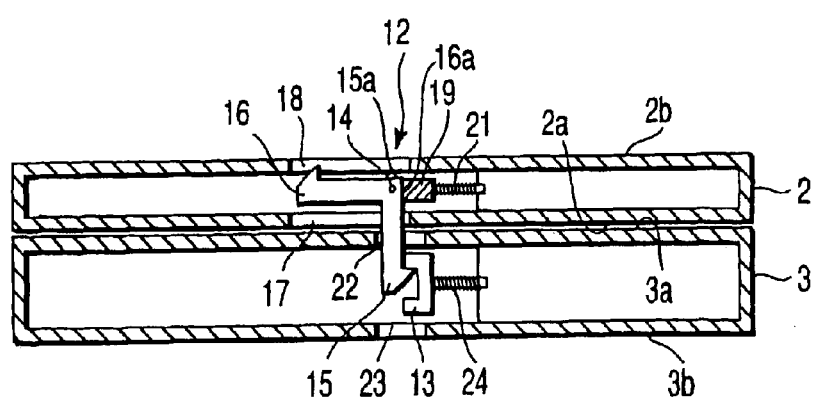
FIG. 8 is a schematic cross-sectional view of the latch mechanism in the first state, as viewed in the direction of arrow B in FIG. 2.
Figure 9:
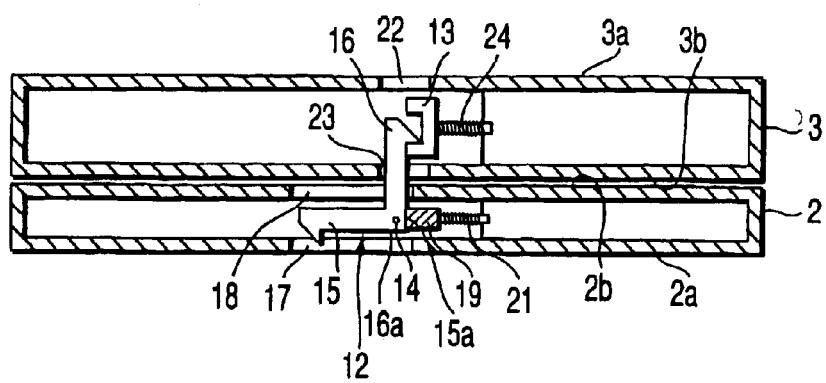
FIG. 9 is a schematic cross-sectional view of the latch mechanism in the second state, as viewed in the direction of arrow B in FIG. 2.

FIGS. 8 and 9 schematically show the latch mechanism, as viewed in the direction of arrow B in FIG. 2. FIG. 8 shows the first state, and FIG. 9 the second state. In the first state, the display surface 2a of display panel 2 faces the top surface 3a of main body 3. In the second state, the back surface 2b of display panel 2 faces the bottom surface 3b of main body 3, and the display screen 6 is directed outward.

When an input operation is performed using the keyboard 8 of the PC 1 with the above-described structure, the latch mechanism in the first state is released by operating the lever 25 and the display panel 2 is raised. When an input operation is performed using the touch panel 7, the display panel 2 of PC 1 is flipped over from the first state (FIG. 8) to the second state (FIG. 9). The engaging member 12 of the latch mechanism 5 is switched from the state in which the first claw 15 is exposed to the state in which the second claw 16 is exposed. At the same time as the display panel 2 is flipped over to the bottom surface 3b side of the main body 3, the PC 1 is turned upside down such that the display screen 6 and touch panel 7 may face upward, as shown in FIG. 3. In the second state, the second claw 16 and stopper portion 13 of the latch mechanism 5 are engaged.

In the first state and second state, the display panel 2 and main body 3 are fixed by the latch mechanism 5. Hence, the touch panel 7 can be stably used and operated, with no rattling of display panel 2.

Referring to FIGS. 10 to 14, a description will now be given of a PC 41 as an example of an electronic apparatus of a second embodiment according to the present invention.

The structural elements common to those of the PC 1 according to the first embodiment are denoted by like reference numerals, and a description thereof is omitted.

Figure 10:
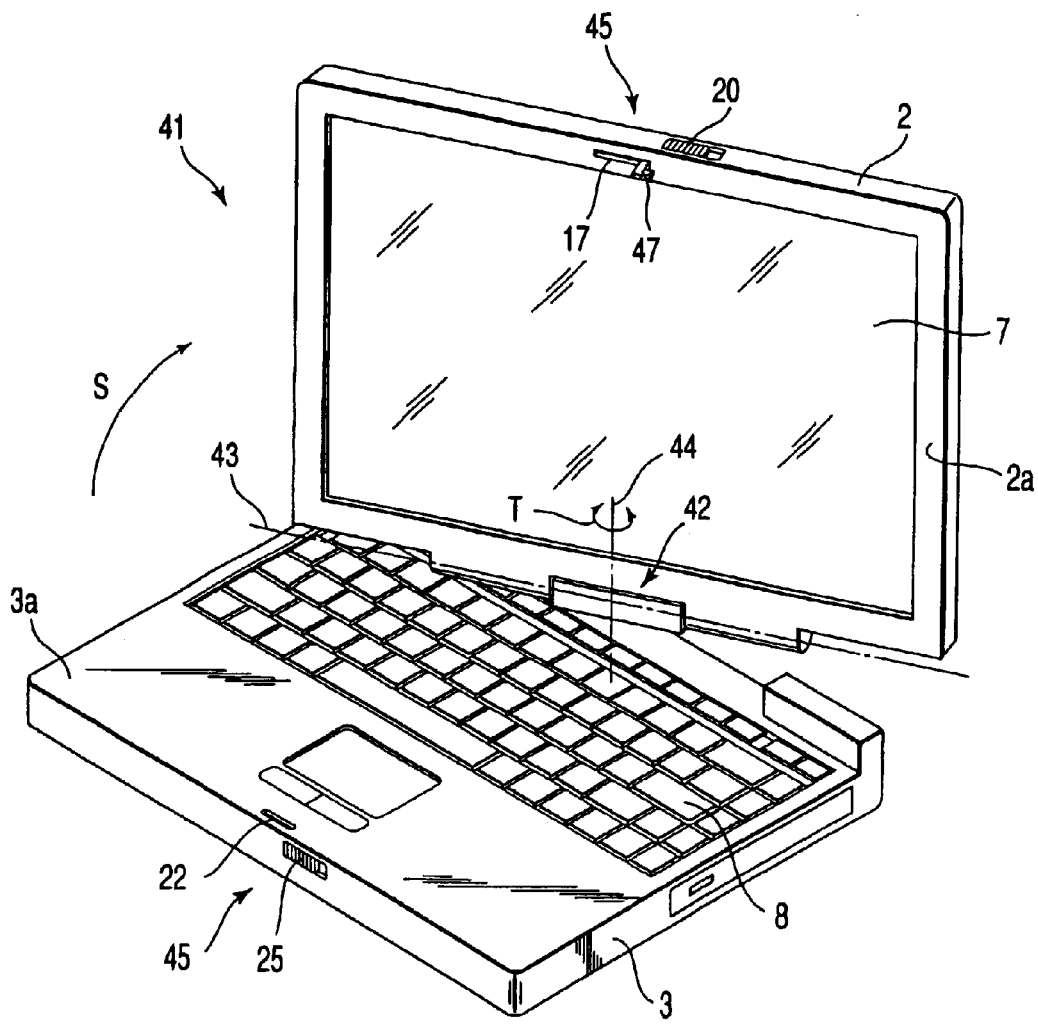
FIG. 10 is a perspective view showing a personal computer according to a second embodiment of the present invention.

As is shown in FIG. 10, a hinge mechanism 42 of the PC 41 has a rotation shaft, which allows the display panel 2 to rotate on a lateral axis 43 and a swivel shaft, which allows the display panel 2 to rotate on a swivel axis 44 (both indicated by dot-and-dash lines). The display panel 2 is raised away from the main body 3 by being rotated on the lateral axis 43 in the direction of arrow S. The display panel 2 is turned over at raised position on the swivel axis 44 in the direction of arrow T. The hinge mechanism 42 has rotational resistance caused by friction on the lateral axis 43 and the swivel axis 44, and function to hold the display panel 2 at a desired angle relative to the main body 3.

Figure 11:
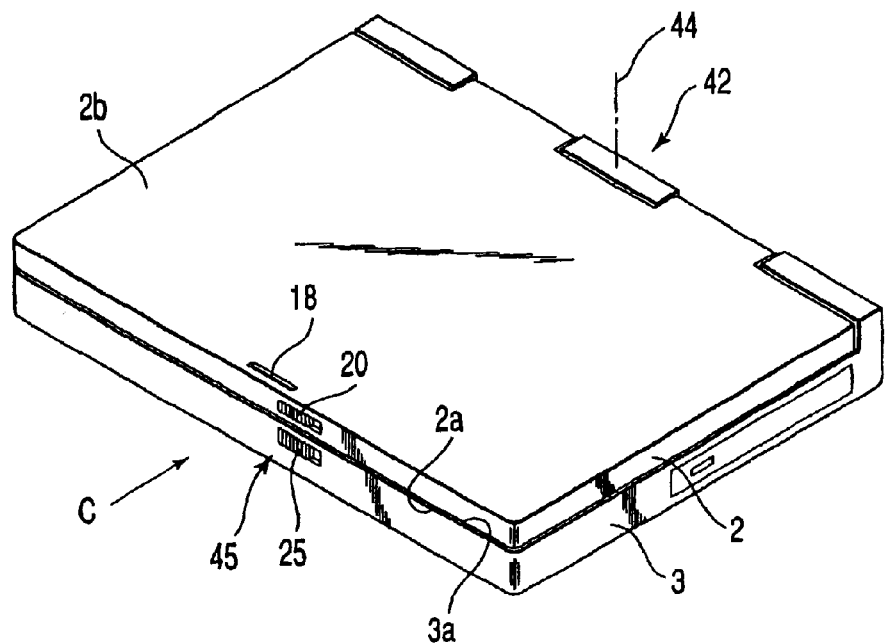
FIG. 11 is a perspective view showing a first state in which a display panel and a main body of the personal computer shown in FIG. 10 are superposed on each other.
Figure 13:
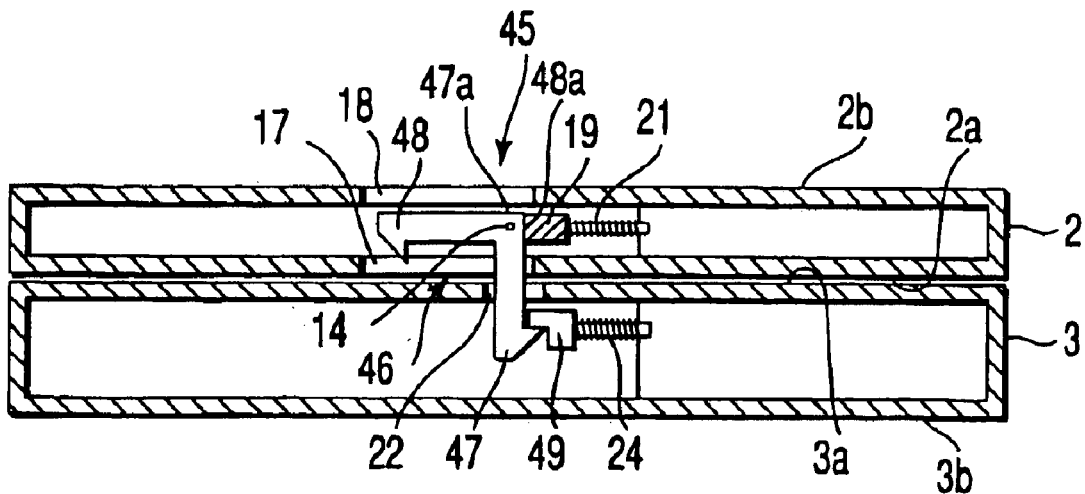
FIG. 13 is a schematic cross-sectional view of the latch mechanism in the first state, as viewed in the direction of arrow C in FIG. 11.
Figure 14:
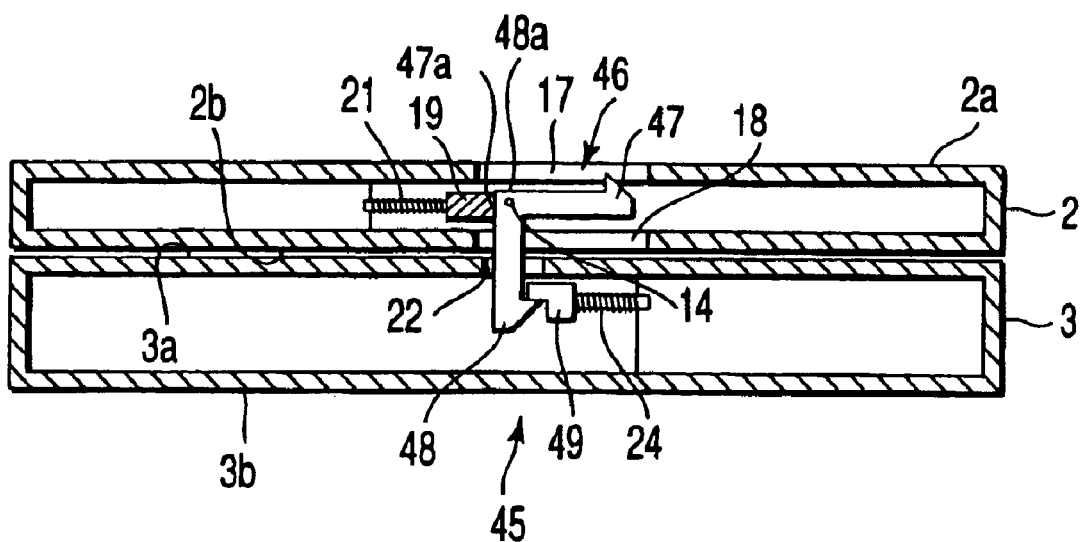
FIG. 14 is a schematic cross-sectional view of the latch mechanism in the second state, as viewed in the direction of arrow C in FIG. 11.

FIG. 13 schematically shows the latch mechanism 45 in a first state, as viewed in the direction of arrow C in FIG. 11, and FIG. 14 schematically shows the latch mechanism 45 in a second state. An engaging member 46 equipped in the display panel 2 has a first claw 47, which is to be exposed to the display surface 2a side, and a second claw 48 which is to be exposed to the back surface 2b side. The first claw 47 is directed to an external-angle side, that is, to an obtuse-angle side. The second claw 48 is directed to an internal-angle side, that is, to an acute-angle side. As is shown in FIG. 13, in the state in which the first claw 47 is exposed, the fixing member 19 abuts on an end face 48a that is located opposed to a distal end portion of the second claw 48. On the other hand, as is shown in FIG. 14, in the state in which the second claw 48 is exposed, the fixing member 19 abuts on an end face 47a that is located opposed to a distal end portion of the first claw 47.

In the first state, as shown in FIG. 11, the display surface 2a of display panel 2 that is the second casing body faces the top surface 3a of the main body 3 that is the first casing body. In the second state, as shown in FIG. 14, the back surface 2b of display panel 2 faces the top surface 3a of the main body 3. Thus, a stopper portion 49 of the latch mechanism 45 engages the claw 47, 48 that has been inserted in the main body 3 from the top surface 3a side thereof.

Figure 12:
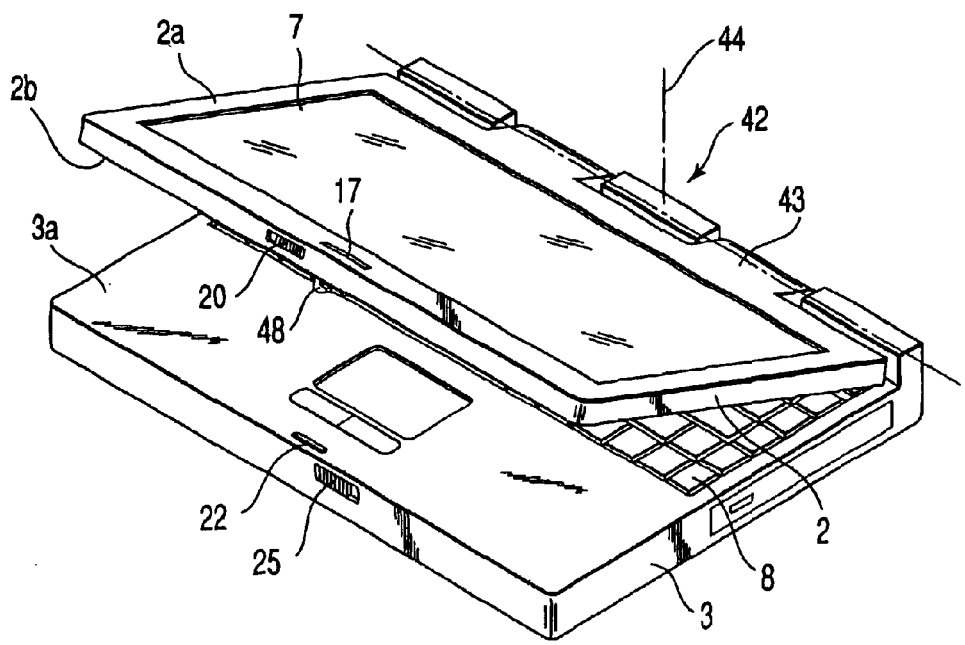
FIG. 12 is a perspective view showing a state in which the display panel of the personal computer of FIG. 10 is turned over and folded back onto the top surface of the main body.

When an input operation is performed using the keyboard 8 of the PC 41, the stopper portion 49 of latch mechanism 45 in the first state (FIG. 11) is released by operating the lever 25 and the display panel 2 is rotated on the lateral axis 43 and raised. When an input operation is performed using the touch panel 7, the display panel 2 is swiveled on the swivel axis 44, as illustrated in FIG. 10. Then, as shown in FIG. 12, the display panel 2 is turned toward the main body 3 such that the top surface 3a of main body 3 faces the back surface 2b of display panel 2. By the time the display panel 2 has reached the second state, the first claw 47 is put in the display panel 2 and the second claw 48 is exposed. In the second state, the second claw 48 and stopper portion 49 are engaged and the display panel 2 and main body 3 are fixed.

According to the PC 41 of this embodiment, when the touch panel 7 is used by swiveling or turning over the display panel 2, there is no need to turn the main body 3 upside down. In this case, there is less detrimental effect on driving components such as a hard disk drive housed in the main body 3.

The electronic apparatus according to the present invention may be a mobile electronic apparatus with a display screen, such as a mobile phone or a PDA (Personal Digital Assistant), as well as the personal computer described in connection with the first and second embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:

a first casing body;

a second casing body which is coupled to the first casing body via a hinge mechanism and is rotatable between a first state, in which one surface of the second casing body is superposed on the first casing body, and a second state in which another surface of the second casing body is superposed on the first casing body;

an engaging member projecting from the one surface of the second casing body in the first stare and projecting from the other surface of the second casing body in rite second state;

a stopper portion which is provided in the first casing body and moves to engage with the engaging member in the first casing body;

a stopper portion operating lever provided in the first casing body and coupled with the stopper portion to be able to release an engagement state between the engaging member and the stopper portion in either one of the first state and the second state;

a fixing member configured to fix the engaging member in such a state that it projects from the one surface in the first state, and to fix the engaging member in such a state that it projects from the other surface in the second state; and a fixing member operating lever provided in the second casing body and coupled to the fixing member to release a fixation state of the stopper portion.

2. An electronic apparatus according to claim 1, wherein the engaging member has a first claw and a second claw, the second claw retreats in the second casing body when the first claw projects from the one surface of the second casing body, and the first claw retreats in the second casing body when the second claw projects from the other surface of the second casing body.

3. An electronic apparatus according to claim 2, wherein the fixing member fixes the engaging member in such a state that the first claw projects from the one surface in the first state, and fixes the engaging member in such a state that the second claw projects from the other surface in the second state.

4. An electronic apparatus according claim 1, wherein the first casing body has a top surface and a bottom surface, the hinge mechanism has two parallel binge shafts, and via the two hinge shafts, the one surface of the second casing body faces the top surface of the first casing body in the first state and the other surface of the second casing body faces the bottom surface of the first casing body in the second state.

5. An electronic apparatus according to claim 4, wherein the stopper portion engages the engaging member in each of the first and second states of the second casing body.

6. An electronic apparatus according to claim 1, wherein the hinge mechanism has a rotation shaft, by which the second casing body is raised away from the first casing body, and a swivel shaft, by which the second casing body in the raised state is turned.

7. An electronic apparatus comprising:

a main body;

a display panel;

a hinge mechanism having a rotation shaft, by which the display panel is raised away from the main body, and a swivel shaft, by which the display panel in the raised state is turned;

a stopper portion provided movably in the main body;

a stopper portion operating lever provided in the main body to be operable from outside the main body and coupled to the stopper portion, while the display panel is overlaid on the main body;

an engaging member provided in the display panel, the engaging member being projectable selectively from one of a display surface and a back surface of the display panel, and the engaging member engaging the stopper portion in a state in which the display panel is superposed on the main body;

a fixing member configured to fix the engaging member in such a state that a part of the engaging member projects from the display surface or the back surface; and a fixing member operating lever provided for the display panel and coupled to the fixing member to release a fixation state of the engaging member.

8. An electronic apparatus according to claim 7, wherein the display panel has a first hole provided in the display surface and a second hole provided in the back surfaces, and the engaging member projects selectively from one of the first hole and the second hole.

9. An electronic apparatus according to claim 8, wherein the engaging member has a first claw projectable from the first hole and a second claw projectable from the second hole.

10. An electronic apparatus according to claim 9, wherein the second claw retreats in the display panel when the first claw projects from the first hole, and the first claw retreats in the display panel when the second claw projects from the second hole.

* * * * *